(12) United States Patent
Traenklein

(10) Patent No.: US 10,639,700 B2
(45) Date of Patent: May 5, 2020

(54) MACHINE TOOLS AND METHODS FOR PROCESSING WORKPIECES WITH A PUNCHING DEVICE AND LASER PROCESSING DEVICE

(71) Applicant: TRUMPF Werkzeugmaschinen GmbH and Co. KG, Ditzingen (DE)

(72) Inventor: Dennis Traenklein, Nufringen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 540 days.

(21) Appl. No.: 15/460,922

(22) Filed: Mar. 16, 2017

(65) Prior Publication Data

US 2017/0266712 A1  Sep. 21, 2017

(30) Foreign Application Priority Data

Mar. 17, 2016  (EP) .................................... 16160857

(51) Int. Cl.
*B21D 28/34* (2006.01)
*B23K 26/70* (2014.01)
(Continued)

(52) U.S. Cl.
CPC ............ *B21D 28/34* (2013.01); *B21C 51/005* (2013.01); *B21D 45/006* (2013.01);
(Continued)

(58) Field of Classification Search
CPC .. B21D 45/006; B21D 28/34; B23K 26/0093; B23K 26/0876; B23K 26/706;
(Continued)

(56) References Cited

U.S. PATENT DOCUMENTS 4,698,480 A * 10/1987 Klingel .................. B21D 28/12
219/121.39
5,948,292 A *  9/1999 Tanaka ................ B23K 26/046
219/121.6

(Continued)

FOREIGN PATENT DOCUMENTS

DE       202009013899 U1    3/2010
EP             0158866 B1    6/1989
(Continued)

*Primary Examiner* — Dana Ross
*Assistant Examiner* — Joe E Mills, Jr.
(74) *Attorney, Agent, or Firm* — Fish & Richardson P.C.

(57) ABSTRACT

A machine tool for processing workpieces, in particular metal sheets, has a punching device and a laser processing device. The punching device comprises a punch-side positioning device by means of which a punching tool component of a punching tool can be positioned in a definable position along an operating stroke axis of the punching device. The laser processing device has a laser processing unit and a laser accessory unit. The laser accessory unit can be positioned by means of an accessory unit positioning device with an activation movement in an operating position which can be defined by means of the punch-side positioning device. In the context of a method for processing workpieces, in particular metal sheets, which method is carried out using the above machine tool, the operating position of the laser accessory unit is defined by means of the punch-side positioning device.

14 Claims, 1 Drawing Sheet

(51) Int. Cl.
  *B23K 26/08*   (2014.01)
  *B23K 26/00*   (2014.01)
  *B21C 51/00*   (2006.01)
  *B21D 45/00*   (2006.01)

(52) U.S. Cl.
  CPC ........ *B23K 26/0093* (2013.01); *B23K 26/083* (2013.01); *B23K 26/0876* (2013.01); *B23K 26/706* (2015.10)

(58) Field of Classification Search
  CPC B23K 26/1488; G02B 6/3821; G02B 6/3885; G02B 6/3891; G02B 6/3897; H01M 10/06; H01M 10/52; H01M 2/145; H01M 2/16; H01M 2/18; B21C 51/005; B23P 23/00
  See application file for complete search history.

(56)    References Cited

U.S. PATENT DOCUMENTS

| | | | |
|---|---|---|---|
| 6,144,009 A * | 11/2000 | Ulrich | B23K 26/0093 |
| | | | 219/121.67 |
| 7,745,756 B2 | 6/2010 | Yamazaki et al. | |
| 8,217,301 B2 * | 7/2012 | Schmauder | B23K 26/0093 |
| | | | 219/121.67 |
| 2009/0003952 A1 * | 1/2009 | Schmauder | B23K 26/0093 |
| | | | 409/183 |
| 2009/0005898 A1 * | 1/2009 | Kilian | B23K 26/083 |
| | | | 700/172 |

FOREIGN PATENT DOCUMENTS

| | | |
|---|---|---|
| EP | 2468449 A1 | 6/2012 |
| WO | WO2011045098 A1 | 4/2011 |

* cited by examiner

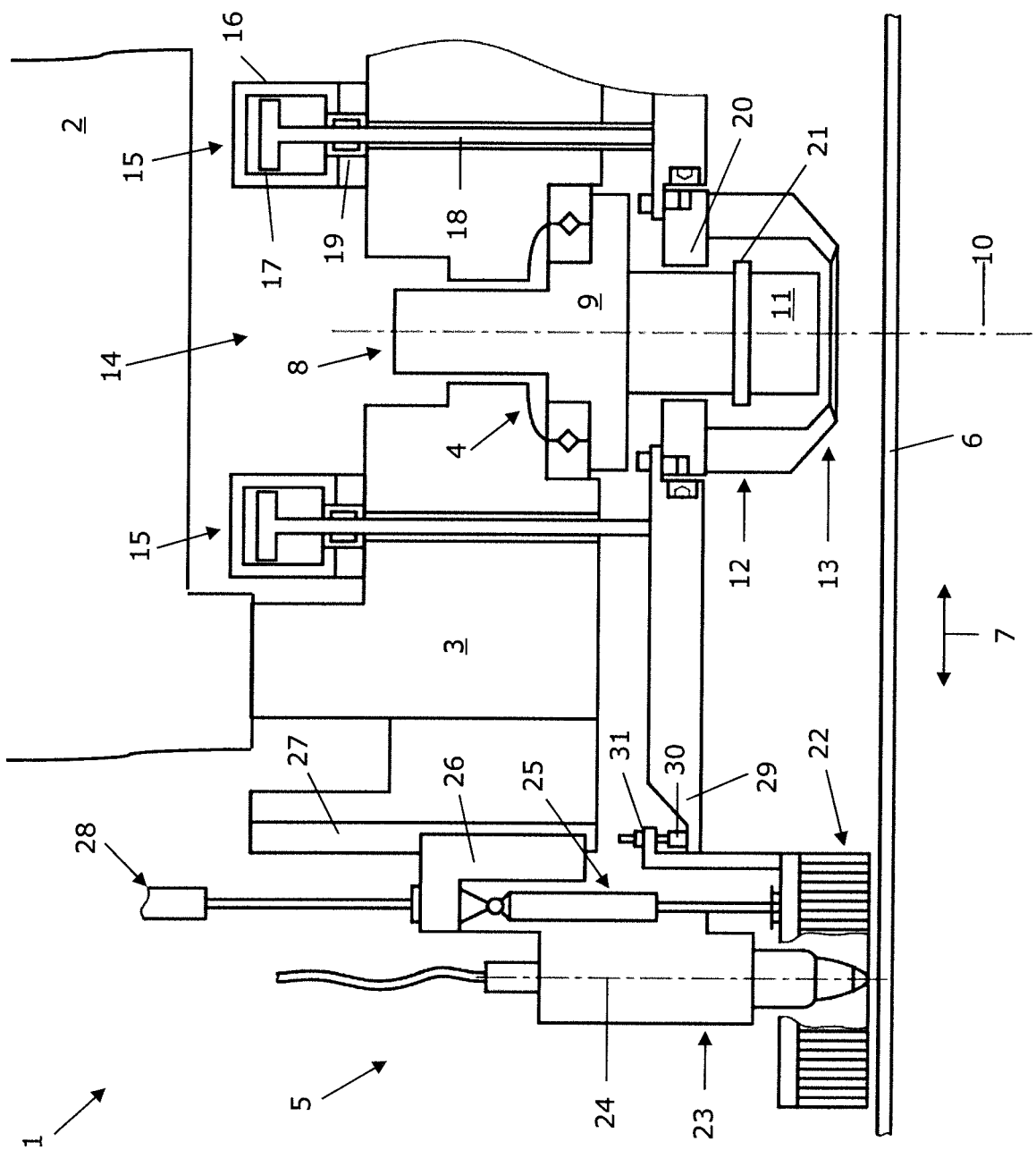

MACHINE TOOLS AND METHODS FOR PROCESSING WORKPIECES WITH A PUNCHING DEVICE AND LASER PROCESSING DEVICE

CROSS REFERENCE TO RELATED APPLICATION

This application claims priority under 35 U.S.C. § 119(a) to European Application No. 16 160 857.5, filed on Mar. 17, 2016, the entire contents of which are hereby incorporated by reference.

TECHNICAL FIELD

The invention relates to a machine tool for processing workpieces, in particular metal sheets.

BACKGROUND

A machine tool and a processing method are disclosed in DE 20 2009 013 899 U1. The machine of the prior art, which is constructed as a combined punch/laser machine, has a C-shaped machine frame having an upper frame leg at the free end of which a punching device and a laser processing device are arranged beside each other. The punching device and the laser processing device serve to process metal sheets which to this end are moved by a coordinate guide over a workpiece table on a lower frame leg of the C-shaped machine frame. For the punching processing of the metal sheet, an upper punch tool of the punching device carries out punching strokes along a vertical operating stroke axis. The laser processing device includes as a processing unit a laser processing head and as an accessory unit a shielding device. The laser processing head can be lifted along a vertical axis into a rest position remote from the workpiece and lowered into an operating position close to the workpiece. From the laser processing head which is located in the operating position, a laser processing beam is directed towards the metal sheet which is intended to be processed. The shielding device of the laser processing device can also be positioned in a vertical direction. In an operating position close to the workpiece, the shielding device serves to shield the processing site of the laser processing beam, which has been directed towards the relevant metal sheet by the laser processing head which has been lowered into the operating position, against the environment to in particular prevent in this manner laser radiation from emerging from the processing site of the laser processing beam into the environment. The operating position of the shielding device is defined in such a manner that a gap having a gap width of preferably approximately one millimeter remains between the lower side of the shielding device which is arranged in the operating position and the upper side of the metal sheet which is processed by the laser processing beam.

SUMMARY

The machine tools described herein have a punching device and a laser processing device, wherein the punching device includes a punch-side positioning device by which a punching tool component of a punching tool can be positioned in a definable position along an operating stroke axis of the punching device and wherein the laser processing device has a laser processing unit and a laser accessory unit and the laser accessory unit can be positioned by an accessory unit positioning device with an activation movement in a definable operating position.

The invention further relates to methods for processing workpieces, in particular metal sheets, by a machine tool which has a punching device and a laser processing device, wherein a punching tool component of a punching tool of the punching device is positioned by a punch-side positioning device of the punching device along an operating stroke axis of the punching device in a definable position and wherein a laser accessory unit of the laser processing device which further includes a laser processing unit is positioned by an accessory unit positioning device with an activation movement in a definable operating position.

An advantage of the present invention is the ability to implement, using the simplest means possible, a functionality of the type described above on a machine tool having a punching device and having a laser processing device which includes a laser processing unit and a laser accessory unit.

In the case of the invention, a punch-side positioning device, by which a punching tool component of a punching tool is otherwise positioned along an operating stroke axis and which is consequently suitable for carrying out a defined positioning with respect to a workpiece, is also used to define the operating position of a laser accessory unit of a laser processing device. With the punch-side positioning device, one and the same functional unit performs an advance or positioning function both at the punch side and at the laser processing side of the machine tool. Since the accessory unit positioning device of the laser accessory unit accordingly does not have to define the operating position of the laser accessory unit, an accessory unit positioning device of simple construction type is sufficient for the machine tool. In the same manner as the remaining significant functional units of the machine tool, the punch-side positioning device and the accessory unit positioning device are also controlled by a programmable numerical control of the machine tool.

In some embodiments, the operating position of the laser accessory unit is defined in a simple manner in that, by the punch-side positioning device, a stop for the laser accessory unit is positioned along the operating stroke axis of the punching device in a stop position which is defined in such a manner that the laser accessory unit which is supported on the stop in the direction of the activation movement assumes the operating position. For the laser accessory unit, it accordingly requires only an accessory unit positioning device which is capable of moving the laser accessory unit into abutment with the stop which has been positioned by the punch-side positioning device.

In another embodiment of the invention, there is provision for the punch-side positioning device to jointly position the stop for the laser accessory unit and the punching tool component of the punching tool along the operating stroke axis of the punching device. A common positioning of the stop for the laser accessory unit and the punching tool component of the punching tool is, for example, possible when the stop for the laser accessory unit and the punching tool component which is intended to be positioned by the punch-side positioning device are mechanically connected to each other.

The operating position of the laser accessory unit may be dependent on the type of the laser accessory unit and/or the specific application thereof. If, for example, workpieces with a changing thickness are processed by a laser processing beam that is directed towards the workpiece by a laser processing unit and if there is provided as a laser accessory unit a shielding device intended to shield the workpiece-side processing location of the laser processing beam with respect to the environment and that regardless of the thickness of the processed workpiece is intended to have a constant distance from the workpiece surface, the operating position of the laser accessory unit in the coordinate system of the machine tool must be defined in accordance with the workpiece thickness and consequently in a variable manner.

A fine adjustment of the operating position of the laser accessory unit is possible in the case of the machine tool in that the laser accessory unit has a counter-stop that can be adjusted in the direction of the activation movement thereof and via which the laser accessory unit is supported in the direction of the activation movement on the stop, which is positioned along the operating stroke axis of the punching device by the punch-side positioning device. In some embodiments, for reasons of simplicity, an adjustment screw is provided as an adjustment device for fine adjustment of the operating position of the laser accessory unit.

Other embodiments provide a laser movement unit on which the laser processing unit, the laser accessory unit, and the accessory unit positioning device of the laser processing device. By a processing unit positioning device, the laser movement unit can be positioned in positions associated with a rest position of the laser processing unit remote from the workpiece or an operating position of the laser processing unit close to the workpiece. The accessory unit positioning device provided on the laser movement unit serves to position the laser accessory unit with the activation movement relative to the laser movement unit in the defined operating position. As a result of the use of a processing unit positioning device and an accessory unit positioning device which is separate therefrom, the laser processing unit and the laser accessory unit of the laser processing device can be positioned in a state decoupled from each other. This condition is, for example, significant against the background that, in the laser processing of workpieces, it may be necessary for the laser processing unit, to ensure a constant focal position of the laser processing beam on the processed workpiece, to have to carry out compensation movements with respect to the workpiece while, for a shielding device for the workpiece-side processing location of the laser processing beam, the shielding device being provided as a laser accessory unit, such compensation movements are not desirable. Furthermore, a positioning movement of the laser movement unit which is provided with the laser accessory unit, which movement is produced by the processing unit positioning device, can be used to move the laser accessory unit into a position which is located towards the operating position of the laser accessory unit. On the basis of this pre-adjustment of the laser accessory unit, it then needs only one activation movement with a relatively small value to move the laser accessory unit into the operating position. The activation movement of the laser accessory unit into the operating position can consequently be produced by an accessory unit positioning device, which is small and/or which is constructed in a technically simple manner.

In the case of the invention, the punching tool component whose punch-side positioning device is used to define the operating position of the laser accessory unit may in principle be a punching tool component that processes a workpiece by cutting. Punch-side positioning devices within the meaning of the invention may accordingly also include a punch drive of the punching device of the machine tool.

In some embodiments, a punch-side positioning device is provided in addition to a punch drive, wherein by the punch drive a punching processing unit and by the punch-side positioning device a punching tool component of a punching tool, which component is different from the punching processing unit, is moved along the operating stroke axis of the punching device. The punching processing unit is moved by the punch drive along the operating stroke axis with an operating stroke directed towards a workpiece and with a return stroke directed counter to the operating stroke. The return stroke of the punching processing unit produced by the punch drive is used to position the laser accessory unit of the laser processing device, which unit has been positioned by the accessory unit positioning device in the operating position, from the operating position into a non-operating position.

In some embodiments, a carrier is provided on a tappet of the punch drive to move the laser accessory unit into the non-operating position. If the operating position of the laser accessory unit is defined by a stop can be positioned by the punch-side positioning device, the carrier that is provided on the tappet of the punch drive, in the event of a retraction movement of the tappet connected with a return stroke of the punch drive, can carry the stop and can move via the stop the laser accessory unit, which is supported on the stop in the direction of the activation movement, from the operating position into the non-operating position.

In further embodiments, there is provided as a punch-side positioning device for defining the operating position of the laser accessory unit a positioning device, which is otherwise used to position a punching tool component in the form of a stripper of the punching tool along the operating stroke axis of the punching device.

Using a piston/cylinder unit advantageously has a structurally simple, but nonetheless operationally reliable, positioning device as an accessory unit positioning device and/or as a punch-side positioning device and/or as a processing unit positioning device.

Particularly practice-relevant embodiments of the laser accessory unit are provided where a laser accessory unit which can be used both as a shielding device and as a workpiece holding-down member is preferred.

DESCRIPTION OF DRAWING

FIG. 1 is a schematic illustration of one example of a machine tool according to the invention.

DETAILED DESCRIPTION

FIG. 1 shows a portion of a machine tool 1 which is a combined punch/laser machine. The machine tool 1 has a machine frame 2 on which a carrier structure 3 is movably guided perpendicular to the drawing plane. The carrier structure 3 supports a punching device 4 and a laser processing device 5. Both the punching device 4 and the laser processing device 5 are used to process a workpiece, typically a metal sheet 6, which during the processing operation is supported on a workpiece table of conventional construction type, which is not illustrated for reasons of simplicity. The metal sheet 6 can be moved for processing purposes by a conventional coordinate guide over the workpiece table in the direction of a double-headed arrow 7.

As a result of the movability of the carrier structure 3 perpendicular to the drawing plane and the simultaneously existing movability of the metal sheet 6 in the direction of the double-headed arrow 7, the punching device 4 and the laser processing device 5 can be positioned at any desired location of the metal sheet 6.

The punching device 4 includes a punch drive 8 with a hydraulic or electrical drive assembly of conventional construction (not illustrated) and with a tappet 9, which can be raised and lowered by the drive assembly along an operating stroke axis 10 of the punching device 4. A punching die acts as a punching processing unit of conventional construction and is introduced in a tool receiving member 11 at the lower end of the tappet 9 for punching processing of the metal sheet 6. In FIG. 1, the punching die is not shown, nor is a conventional bottom punching die that cooperates with the punching die and that is opposite the punching die below the metal sheet 6, which coordinate to carry out the punching processing of the metal sheet 6. The punching die and the bottom punching die form a punching tool 13 of the punching device 4, together with a stripper 12, which is an additional punching tool component.

The tappet 9 can be raised and lowered by the drive assembly of the punch drive 8 along the operating stroke axis 10, and the stripper 12 of the punching tool 13 also can be positioned in defined positions by a punch-side positioning device 14 along the operating stroke axis 10 of the punching device 4. The punch drive 8 and the punch-side positioning device 14 are controlled by a programmable numerical control unit as are the remaining functional units of the machine tool 1.

The punch-side positioning device 14 includes two structurally identical piston/cylinder units 15, each of which has a cylinder 16 connected to the carrier structure 3 of the machine tool 1 and a piston 17 which can move inside the cylinder 16 along the operating stroke axis 10. A piston rod 18 is fitted to each of the pistons 17 and leaves the respective cylinder 16 downwards and extends from the piston 17 along the operating stroke axis 10. The piston rod 18 of each piston/cylinder unit 15 is connected to the stripper 12 at the end remote from the piston 17. A hydraulically actuatable clamping device 19 with two mutually opposed clamping jaws is around each piston/cylinder unit 15 close to the outlet of the piston rod 18 at the respective cylinder 16.

As a result of the selected drive configuration, the stripper 12 of the punching tool 13 and the tappet 9 of the punch drive 8 (fitted with the punching die of the punching tool 13) can be moved in a state decoupled from, or independent of, each other along the operating stroke axis 10 of the punching device 4. During the punching processing of the metal sheet 6 the punch-side positioning device 14 can therefore be operated in two different operating modes: in the "active stripper" operating mode or in the "passive stripper" operating mode.

At the beginning of a punching operation, the tappet 9 of the punch drive 8 is located at its top dead center. The stripper 12 is moved by the punch-side positioning device 14 into its upper end position and spaced apart from the metal sheet 6 to the maximum extent. An inner collar 20 of the stripper 12 is positioned vertically above an outer collar 21 of the tappet 9.

In the "active stripper" operating mode of the punch-side positioning device 14, the clamping devices 19 on the piston/cylinder units 15 are continuously deactivated. As a result of a pressure which is built up in the cylinders 16 of the piston/cylinder units 15 above the pistons 17, the stripper 12 is consequently pressed via the pistons 17 and the piston rods 18 along the operating stroke axis 10 of the punching device 4 with the inner collar 20 from above onto the outer collar 21 of the tappet 9. The lower end of the stripper 12 in this instance protrudes with respect to the punching die, which is fitted to the tappet 9 in the direction towards the metal sheet 6.

If, starting from these relationships, the punch drive 8 is actuated and the punching die is consequently moved with an operating stroke directed towards the metal sheet 6 and if the pistons 17 inside the cylinder 16 of the piston/cylinder units 15 of the punch-side positioning device 14 are further acted on with pressure at their upper sides, the tappet 9 is lowered together with the stripper 12. The inner collar 20 of the stripper 12 is positioned on the outer collar 21 of the tappet 9 and moves along the operating stroke axis 10 of the punching device 4 in the direction towards the metal sheet 6 along with the punching die. During the joint downward movement along the operating stroke axis 10, the stripper 12, which is initially leading with respect to the punching die in the direction of the operating stroke of the punching die, strikes the upper side of the metal sheet 6, while the tappet 9 holds the punching die and they continue their downward movement. During the continued lowering movement of the tappet 9 and the punching die relative to the stripper 12, the punching die in the tappet 9 produces a punched-out portion on the metal sheet 6 in cooperation with the bottom punching die located at the opposite side of the metal sheet 6.

When the operating stroke of the punching die has ended and when the tappet 9 is positioned in its lower dead center position, the cylinder chambers formed inside the cylinders 16 of the piston/cylinder units 15 above the pistons 17 are switched into a pressure-free state. If the punching die now carries out a return stroke directed counter to the previous operating stroke and if the tappet 9 consequently moves along the operating stroke axis 10 with an upward retraction movement, the outer collar 21 of the tappet 9 strikes the lower side of the inner collar 20 of the stripper 12, which is initially still positioned on the metal sheet 6. If the retraction movement of the tappet 9 along the operating stroke axis 10 is continued, the tappet 9 carries the stripper 12 into its upper end position in which the lower end of the stripper 12 is again spaced apart from the metal sheet 6 to the maximum extent.

This can then be followed by another punching processing of the metal sheet 6 which where applicable is carried out in the manner described above. In the "active stripper" operating mode of the punch-side positioning device 14, the stripper 12 is accordingly lowered with continuously deactivated clamping devices 19 of the punch-side positioning device 14 with each operating stroke of the punching die from the upper end position until it strikes the metal sheet 6 which is intended to be processed.

The relationships in the "passive stripper" operating mode of the punch-side positioning device 14 are different. In this operating mode of the punch-side positioning device 14, the inner collar 20 of the stripper 12 is located in the upper end position. By actuating the piston/cylinder units 15 of the punch-side positioning device and with the clamping devices 19 of the punch-side positioning device 14 deactivated the inner collar 20 is initially pressed along the operating stroke axis 10 from above onto the outer collar 21 of the tappet 9 which is at its top dead center position. In the "passive stripper" operating mode of the punch-side positioning device 14, an activation of the punch drive 8 carried out under these conditions also results in the tappet 9 and the stripper 12 initially carrying out a common lowering movement along the operating stroke axis 10.

In the "passive stripper" operating mode of the punch-side positioning device 14, however, the joint lowering movement of the tappet 9 and the stripper 12 ends before the stripper 12 strikes the metal sheet 6. Instead, at a time at which the lower side of the stripper 12 is still approximately one millimeter away from the metal sheet 6, the clamping devices 19 on the piston/cylinder units 15 of the punch-side positioning device 14 are actuated. The stripper 12 is thereby prevented from carrying out a continued lowering movement along the operating stroke axis 10. As a result of the clamping of the piston rods 18 of the piston/cylinder units 15, the stripper 12 does not accompany the tappet 9 performing the further lowering movement. While the tappet 9 is lowered further and while the punch die which is fitted to the tappet 9 continues its operating stroke along the operating stroke axis 10 of the punching device 4 and finally carries out a punching processing operation on the metal sheet 6, the stripper 12 remains along the operating stroke axis 10 in the position in which it has a defined spacing from the metal sheet 6. During the retraction movement of the tappet 9 following the operating stroke of the punching die, the outer collar 21 of the tappet 9 strikes the inner collar 20 of the stripper 12 which is fixed in position by the clamping devices 19. If the piston/cylinder units 15 of the punch-side positioning device 14 are now switched into a pressure-free state and the clamping devices 19 are released, the tappet 9 with continued retraction movement can carry the stripper 12 into its upper end position.

In the "passive stripper" operating mode, during laser operation of the machine tool 1 the punch-side positioning device 14 of the machine tool 1 defines an operating position of a shielding device 22 of the laser processing device 5. The shielding device 22 is a laser accessory unit.

The shielding device 22 and a laser cutting head 23 act as a laser processing unit of the laser processing device 5. The function of the shielding device 22 substantially involves shielding the processing site of the laser processing beam on the metal sheet 6 against the environment during the processing of the metal sheet by a laser processing beam which is directed from the laser cutting head 23 onto the metal sheet 6. The relationships during the processing of the metal sheet 6 by the laser processing beam which is indicated by a beam axis 24 are illustrated in FIG. 1. In addition, the shielding device 22 can also be used as a workpiece holding-down member and can as such prevent wobbling of the metal sheet 6 during sheet movements which are carried out in the direction of the double-headed arrow 7.

The shielding device 22, the laser cutting head 23 and an accessory unit positioning device in the form of a piston/cylinder unit 25 are on a carriage 26 which is movably guided along the operating stroke axis 10 of the punching device 4 on a linear guide 27 of the carrier structure 3 of the machine tool 1. A processing unit positioning device 28 moves the carriage 26 along the linear guide 27. The processing unit positioning device is illustrated as a piston/cylinder unit 28 whose cylinder is illustrated in a broken-away state in FIG. 1 and is connected at the end that is not visible in the figure to the carrier structure 3 of the machine tool 1.

During the punching processing operation of the metal sheet 6, the laser processing device 5 is non-operational. The piston/cylinder unit 28 has moved the carriage 26 along the linear guide 27 of the carrier structure 3 into an upper end position and the laser cutting head 23, which is fitted to the carriage 26 has thereby been moved into a rest position remote from the workpiece. A laser nozzle, which is constructed in a conventional manner is located at the workpiece-side end of the laser cutting head 23 and is therefore relatively distant from the metal sheet 6 to be processed. The piston rod of the piston/cylinder unit 25, which is connected to the shielding device 22, is introduced into the interior of the associated cylinder. Consequently, the shielding device 22 assumes a position in which the laser nozzle protrudes substantially towards the metal sheet 6 at the lower end of the laser cutting head 23 with respect to the lower side of the shielding device 22 along the operating stroke axis 10 of the punching device 4 with respect to the laser cutting head 23, which is positioned in the rest position remote from the workpiece.

If a punching operation on the metal sheet 6 is finished and if accordingly the tappet 9 which is fitted with the punching die is lifted into its top dead center position and the stripper 12 of the punching tool 13 is lifted its upper end position, the laser processing of the metal sheet 6 is prepared using the punch-side positioning device 14.

In the "passive stripper" operating mode of the punch-side positioning device 14, clamping devices 19 of the punch-side positioning device 14 are deactivated initially and the tappet 9 and the stripper 12 which is positioned with the inner collar 20 on the outer collar 21 of the tappet 9 are jointly lowered along the operating stroke axis 10 of the punching device 4. The clamping devices 19 are actuated and the lowering movement of the stripper 12 is consequently ended as soon as a stop 29 connected to the stripper 12 is positioned along the operating stroke axis 10 in a defined stop position which is stored in the numerical control of the machine tool 1. Although the tappet 9 still continues its lowering movement afterwards, it is then stopped by the punch drive 8 being shut down already at a time at which the punching die on the tappet 9 is still significantly spaced apart from the metal sheet 6. The distance between the stopped punching die and the metal sheet 6 can, for example, be sized in such a manner that the metal sheet 6 during metal sheet movements that are carried out in the context of the subsequent laser processing operation in the direction of the double-headed arrow 7 can pass the punching die even when shaped portions protrude upwardly on the metal sheet 6.

When the stop 29 connected to the stripper 12 is positioned by the punch-side positioning device 14 at the defined stop position, the piston/cylinder unit 28 is actuated and the laser cutting head 23 is moved in the direction towards the metal sheet 6 from its rest position remote from the workpiece into an operating position close to the workpiece and in which the laser processing head 23 can process the metal sheet 6 by a laser processing beam. Since the piston/cylinder unit 28 engages with the carriage 26 and the carriage 26 further also supports the piston/cylinder unit 25 acting as an accessory unit positioning device and the shielding device 22, the piston/cylinder unit 25 and the shielding device 22 also perform the lowering movement of the laser cutting head 23 produced by the piston/cylinder unit 28.

When the laser cutting head 23 is positioned in the operating position close to the workpiece, the shielding device 22 is initially still positioned with respect to the laser cutting head 23 so that the lower side of the shielding device 22 has a significantly larger distance from the metal sheet 6 than the laser nozzle at the lower end of the laser cutting head 23 in a vertical direction. The shielding device 22 is consequently not yet capable of performing its intended shielding function.

To change this situation the piston/cylinder unit 25 is actuated. Consequently, the piston rod of the piston/cylinder unit 25 moves downwards from the associated cylinder and the shielding device 22 moves toward the metal sheet 6 and relative to the laser cutting head 23. The activation movement of the shielding device 22 ends as soon as a counter-stop 30, which is connected to the shielding device 22, strikes the stop 29 that has been positioned at the desired stop position by the piston/cylinder units 15 of the punch-side positioning device 14. The stop position of the stop 29 is defined in such a manner that, when the counter-stop 30 of the shielding device 22 is supported by the stop 29, the lower side of the shielding device 22 has a distance of approximately one millimeter from the metal sheet 6. The shielding device 22 consequently assumes its operating position in which the shielding device 22 is capable of shielding the processing site of the laser processing beam, which is directed from the laser cutting head 23 onto the metal sheet 6, from the environment. Via the stop position of the stop 29, which has been positioned by the punch-side positioning device 14 together with the stripper 12 along the operating stroke axis 10 of the punching device 4, the operating position of the shielding device 22 is consequently defined.

An adjustment device 31 is provided between the counter-stop 30 on the shielding device 22 and the stop 29 on the stripper 12. In the example illustrated the adjustment device 31 is an adjustment screw and enables a fine adjustment of the operating position of the shielding device 22.

If a metal sheet of greater thickness is to be processed in place of the metal sheet 6 illustrated in the figure, the stop 29 for the shielding device 22 is positioned by corresponding control of the punch-side positioning device 14, more specifically the clamping devices 19 of the punch-side positioning device 14, into a higher stop position.

This higher stop position is higher than the stop position illustrated in the figure by the sheet thickness difference between the thicker sheet and the sheet shown in the figure. The stop 29 is positioned at a stop position that is lower by the sheet thickness difference when a metal sheet to be worked has a smaller thickness than the metal sheet 6 shown in the figure.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool for processing workpieces comprising:
(a) a punching device configured to hold a punching tool, wherein the punching tool comprises as punching tool components one or both of
   (i) a stripper of the punching tool, and
   (ii) a punching processing unit configured to cut a workpiece;
wherein the punching device comprises a punch-side positioning device configured to position the punching tool component of the punching tool at a definable position along an operating stroke axis of the punching device; and
wherein the punch-side positioning device comprises one or both of
   (i) a piston/cylinder unit configured to position the stripper, and
   (ii) a punch drive configured to position and move the punching processing unit along the operating stroke axis with an operating stroke directed towards the workpiece for processing a workpiece and with a return stroke counter to the operating stroke; and
(b) a laser processing device comprising:
   (i) laser processing unit comprising a laser cutting head configured to direct a laser beam to a workpiece,
   (ii) a laser accessory unit comprising one or both of a shielding unit configured to shield a processing site of the laser beam on a workpiece, and a workpiece holding-down member configured to hold down the workpiece during processing of the workpiece, and
   (iii) a laser accessory unit positioning device comprising a piston/cylinder unit configured to position the laser accessory unit with an activation movement to an operating position, wherein the operating position of the laser accessory unit is defined by the punch-side positioning device.

2. The machine tool according to claim 1, wherein the operating position of the laser accessory unit is defined by the punch-side positioning device by a stop for the laser accessory unit.

3. The machine tool according to claim 2, wherein the stop is active in the direction of the activation movement of the laser accessory unit and is positioned by the punch-side positioning device along the operating stroke axis of the punching device in a stop position such that the laser accessory unit assumes the operating position when it is supported on the stop in the direction of the activation movement.

4. The machine tool according to claim 3, wherein the punch-side positioning device is configured to jointly position the punching tool component of the punching tool and the stop for the laser accessory unit along the operating stroke axis of the punching device.

5. The machine tool according to claim 1, wherein the punch-side positioning device is configured to define the operating position of the laser accessory unit in a variable manner.

6. The machine tool according to claim 5, wherein the operating position of the laser accessory unit is defined by the punch-side positioning device by a stop for the laser accessory unit and wherein the operating position of the laser accessory unit is defined by the punch-side positioning device in a variable manner by the stop position of the stop for the laser accessory unit being able to be varied by the punch-side positioning device.

7. The machine tool according to claim 6, wherein the laser accessory unit has a counter-stop and in the operating position is supported in the direction of the activation movement by the counter-stop on the stop, which has been positioned by the punch-side positioning device along the operating stroke axis of the punching device.

8. The machine tool according to claim 6, wherein the counter-stop and the laser accessory unit can be adjusted relative to each other by an adjustment screw in the direction of the activation movement.

9. The machine tool according claim 1, comprising a laser movement unit configured as a carriage that supports the laser processing unit, the laser accessory unit, and the laser accessory unit positioning device.

10. The machine tool according claim 9, further comprising a laser processing unit positioning device comprising a piston/cylinder unit configured to move the laser processing unit between a rest position remote from the workpiece and an operating position close to the workpiece by positioning the laser movement unit between a position associated with the rest position of the laser processing unit remote from the workpiece and a position associated with the operating position of the laser processing unit close to the workpiece.

11. The machine tool according claim 10, wherein the accessory unit positioning device is configured to position the laser accessory unit relative to the laser movement unit to the operating position with the activation movement.

12. The machine tool according to claim 1, wherein the punch drive is further configured to move the laser accessory unit, positioned in the operating position by the accessory unit positioning device, from the operating position by a deactivation movement directed counter to the activation movement into a non-operational position.

13. The machine tool according to claim 12, wherein the punch drive comprises a tappet, and the punching processing unit is movable by a retraction movement of the tappet with the return stroke and wherein the tappet of the punch drive has a carrier by which the tappet which is moved with the retraction movement carries the stop which has been positioned in the stop position by the punch-side positioning device and thereby positions the laser accessory unit, which is supported on the stop in the direction of the activation movement, from the operating position with the deactivation movement into the non-operational position.

14. A method for processing workpieces by a machine tool that has a punching device and a laser processing device, the method comprising:

positioning a punching tool component of a punching tool of the punching device by a punch-side positioning device of the punching device along an operating stroke axis of the punching device to a definable position, and positioning a laser accessory unit of the laser processing device by a laser accessory unit positioning device of the laser processing device, with an activation movement to an operating position, wherein the operating position of the laser accessory unit is defined by the punch-side positioning device.

\* \* \* \* \*